UNITED STATES PATENT OFFICE.

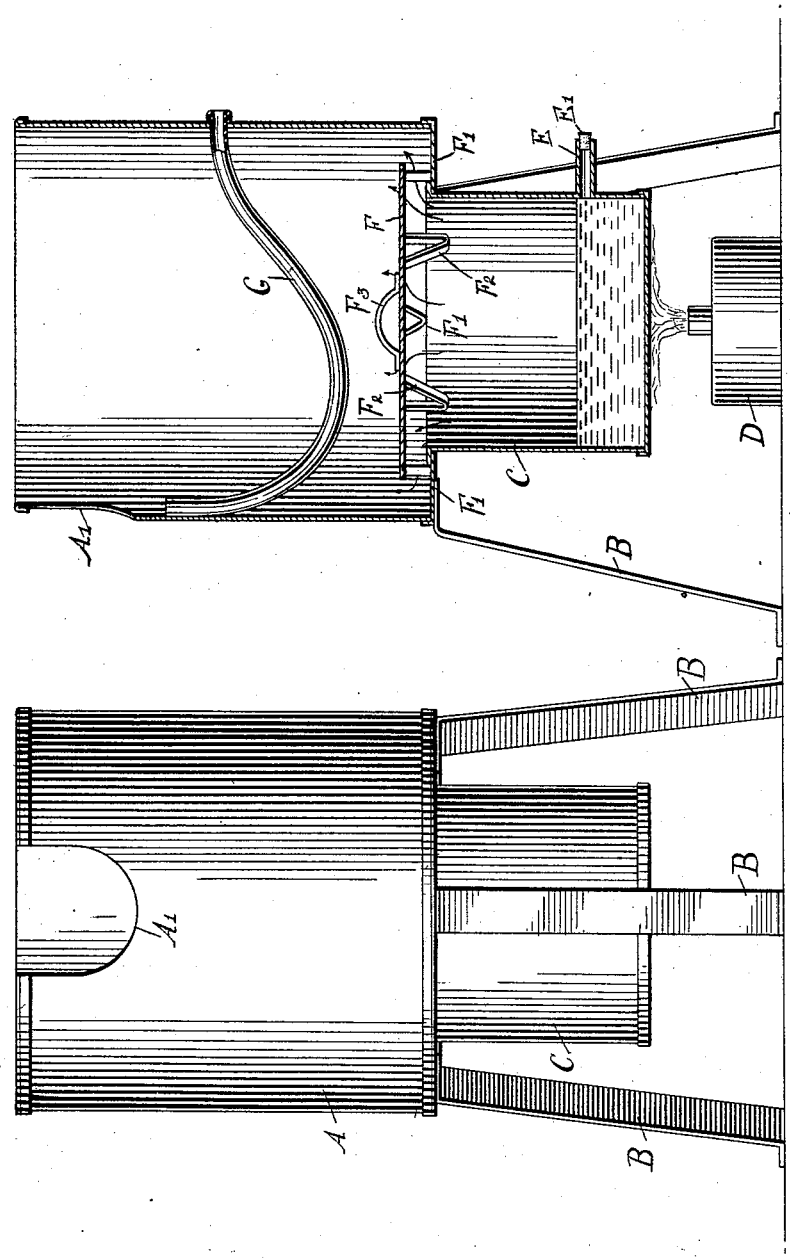

AUGUST FERDINAND KNIESCHE, OF BALTIMORE, MARYLAND.

HEAD-STEAMING APPARATUS.

1,061,083. Specification of Letters Patent. Patented May 6, 1913.

Application filed July 24, 1912. Serial No. 711,217.

*To all whom it may concern:*

Be it known that I, AUGUST F. KNIESCHE, a citizen of the United States, and a resident of Baltimore, in the State of Maryland, have invented a new and Improved Head-Steaming Apparatus, of which the following is a full, clear, and exact description.

My invention is an improvement in the class of head- and face-steaming apparatus in which a water receptacle and steam generator is pendent from the steaming chamber proper in which a person's head is held during the steaming operation.

The invention is embodied in the construction, arrangement, and combination of parts hereinafter described.

A practical embodiment of the invention is represented in the accompanying drawings forming a part of this specification, in which similar characters of reference indicate corresponding parts in both views.

Figure 1 is a front elevation of the head-steaming apparatus; and Fig. 2 is a transverse section of the same.

The steaming chamber A of cylindrical or other shape and open at the top is mounted on legs B adapted to rest on a table or other support, and the front of the steaming chamber A is provided with a cut-out portion or notch A′ for the reception of the neck of a person so that the head of the person extends face downward within the upper portion of the steaming chamber A. From the bottom of the steaming chamber A depends a steam-generating vessel C for containing water and adapted to be heated by a lamp or burner D arranged below the said vessel C, as plainly indicated in Fig. 2. One side of the vessel C is provided with a nipple E for connection with a source of steam supply, in case the latter is available, to permit of passing steam into the said vessel C instead of generating it therein by the use of the lamp or the burner D and water filled into the vessel C. If such source of steam is not available the nipple E is closed by a cork E′ or other means to permit of generating steam therein in the manner above described. The open top of the vessel C opens into the lower end of the steaming chamber A, and within the latter is arranged a detachable deflector F in the form of a disk provided on its under side with legs F′ resting on the upper surface of the bottom of the steaming vessel A. The deflector F is also provided with depending brackets F² fitting against the inner surface of the vessel C so as to hold the deflector against sidewise movement while supported above the open end of the vessel C by the legs F′. The top of the deflector F is provided with a handle F³ for conveniently placing the deflector in position or removing it from the steaming chamber A whenever it is desired to fill the vessel C with water or to clean the interior of the apparatus.

A flexible tube G extends within the steaming chamber A and one end thereof projects through the wall of the steaming chamber A, preferably at the rear thereof, while the other end of the tube is placed in the person's mouth at the time the head is within the steaming chamber A, to permit the person to draw in fresh air during the steaming operation and to exhale through the nose.

When the apparatus is in use the steam rising from the vessel C is deflected by the deflector F toward the sides of the steaming chamber A to permit the steam or vapors to come in contact with the head of the person, it being understood that the head is preferably covered during the steaming operation with a piece of cloth, rubber or the like extending over the upper open end of the steaming vessel A. By having the deflector F the water boiling in the vessel C is not liable to come in contact with the face and hence burning thereof is prevented.

Having thus described my invention, I claim as new and desire to secure by Letters Patent:

1. A head steaming apparatus comprising a steaming chamber open at the top and cut out at the front to receive the neck of a person, said steaming chamber being provided with an annular bottom, a steam generating vessel extending through said annular bottom and depending therefrom, said steam generating vessel being provided with an annular flange engaging said annular bottom for the purpose of supporting said steam generating vessel, and a deflector located within said steaming chamber and extending entirely over said steam generating vessel.

2. A head steaming apparatus comprising a steaming chamber open at the top and cut out at the front to receive the neck of a person, said steaming chamber being provided with an annular bottom, a steam generating vessel extending through said annular bottom and depending therefrom, said steam generating vessel being provided with an annular flange engaging said annular bottom for the purpose of supporting said steam generating vessel, and a deflector located within said steaming chamber and provided with legs resting upon said annular bottom for the purpose of spacing said deflector therefrom, said deflector being provided with depending brackets engaging the inner surface of said steam generating vessel in order to maintain said deflector in a determined position relatively to said steam generating vessel.

In testimony whereof I have signed my name to this specification in the presence of two subscribing witnesses.

AUGUST FERDINAND KNIESCHE.

Witnesses:
 EVELYN TAYLOR,
 LULA I. LEISTER.